(12) United States Patent
Tonry et al.

(10) Patent No.: US 7,804,672 B2
(45) Date of Patent: Sep. 28, 2010

(54) SYSTEM AND METHOD FOR POWER GOOD MONITOR FOR MULTIPLE INFORMATION HANDLING SYSTEM POWER SUPPLIES

(75) Inventors: Richard Tonry, Austin, TX (US); Nikolai Vyssotski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 11/830,091

(22) Filed: Jul. 30, 2007

(65) Prior Publication Data

US 2009/0034141 A1  Feb. 5, 2009

(51) Int. Cl.
*H02H 3/00* (2006.01)
*H02H 3/20* (2006.01)
*H02H 3/24* (2006.01)
(52) U.S. Cl. .............. 361/88; 361/90; 361/92
(58) Field of Classification Search ........... 361/92, 361/88, 90
See application file for complete search history.

(56) References Cited

U.S. PATENT DOCUMENTS

| | | | | |
|---|---|---|---|---|
| 4,951,171 A | | 8/1990 | Tran et al. | 361/90 |
| 5,224,010 A | * | 6/1993 | Tran et al. | 361/90 |
| 5,712,754 A | | 1/1998 | Sides et al. | 361/58 |
| 6,304,088 B1 | | 10/2001 | Yee | 324/433 |

* cited by examiner

*Primary Examiner*—Jared Fureman
*Assistant Examiner*—Lucy Thomas
(74) *Attorney, Agent, or Firm*—Hamilton & Terrile, LLP; Robert W. Holland

(57) ABSTRACT

A switched power rail monitor compares voltages provided by a switched power rail and a power source to detect a predetermined differential indicative of a fault at the switched power rail. A switched power rail fault is communicated to a power manager to take corrective action, such as cutting off power to information handling system components. In one embodiment, a pair of bipolar junction transistors monitor the voltage differential to send an enable signal if the differential is within limits and a disable signal if the differential exceeds limits.

20 Claims, 4 Drawing Sheets

SYSTEM AND METHOD FOR POWER GOOD MONITOR FOR MULTIPLE INFORMATION HANDLING SYSTEM POWER SUPPLIES

BACKGROUND OF THE INVENTION

1. Field of the Invention

The present invention relates in general to the field of information handling system power supplies, and more particularly to a system and method for power good monitor for multiple information handling system power supplies.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One way that information handling systems provide flexibility to accomplish a variety of tasks is that they are built from a variety of processing components. Selection of appropriate processing components, such as CPUs, hard disk drives, embedded controllers, etc . . . , allows an end user to achieve a desired performance level for a given cost. The result is that an information handling system can have a wide variety of components, each with its own power supply requirements. To meet the power needs of processing components, an information handling system often includes power supplies with multiple voltage levels and varied power capabilities. In some instances, information handling systems, such as portable system, use power rail switches to further partition power supply wells. Using power rail switches provides a "subset" power source that aids portable information handling system power management and provides increased flexibility in available power supply sources within a system with reduced cost and footprint.

One difficulty with the use of power rail switches to partition power supply is that each switched power rail should be monitored to ensure that it remains within operating limits. Typically, an information handling system monitors power rails to generate a combined "Power Good" feedback signal that indicates the power rails are working properly. If a failure of any power rail is detected, the Power Good feedback signal is terminated so that a power manager of the information handling system, typically found in an embedded controller, knows that one or more power rails needed for operation of the information handling system are not operational and can take appropriate corrective steps. Failure to detect defective power rails may violate power sequencing specifications, leading to an extreme overheating of integrated circuits that receive power from a failed power rail. Without a failure indication, control logic in the embedded controller, such as a PMC, would continue to enable power delivery to partially-powered target integrated circuits causing severe backdrive and overheating of the integrated circuit. Extreme heat from partial power applied to an integrated circuit may result in catastrophic failure to the information handling system. Although the application of partial power from a switched power rail failure can result in catastrophic damage, switched power rails often remain unmonitored due to the expense of "power good" solutions. Generally, monitoring of non-switched rails by DC-DC regulators or comparator integrated circuits is relied upon to detect and correct power system failures.

SUMMARY OF THE INVENTION

Therefore, a need has arisen for a system and method that detects failures at switched power rails to provide Power Good feedback to an information handling system power manager.

In accordance with the present invention, a system and method are provided which substantially reduce the disadvantages and problems associated with previous methods and systems for detecting information handling system power system failures. Switched power rails of an information handling system are monitored to detect faults so that power can be shut off to information handling system components in the event of a partial power failure due to a switched power rail failure.

More specifically, an information handling system's components are powered by plural switched power rails that interface with a power source by selectively engaging or disengaging a switch. A switched power rail monitor associated with each switched power rail compares the voltage of the switched power rail with the source voltage to detect a fault at a predetermined differential. For example, first and second bipolar junction transistors monitor the switched power rail and source voltages to send an enable signal if the voltages are within limits and a disable signal if the voltages exceed the predetermined differential. In one embodiment, plural switched power rail monitors communicate the enable or disable signal to a cascade monitor that performs an OR function to issue a disable signal to a power manager if any one switched power rail monitor outputs a disable signal.

The present invention provides a number of important technical advantages. One example of an important technical advantage is that switched power rails are monitored to detect failures and to report the failures by disabling a Power Good feedback signal. Monitoring of switched power rails prevents application of partial power to integrated circuits by cutting off power when the Power Good feedback signal indicates any failure. The use of bipolar junction transistors provides a low cost comparator-based power good circuit solution that is practical for commercial use in an information handling system having multiple switch power rail circuits. Monitoring for a Power Good feedback signal that includes switched power rails helps to prevent partial power failures that might otherwise lead to overheating of integrated circuits in an information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Monitoring information handling system switched power rails for failures helps to prevent damage to processing components by partial powering of the components. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
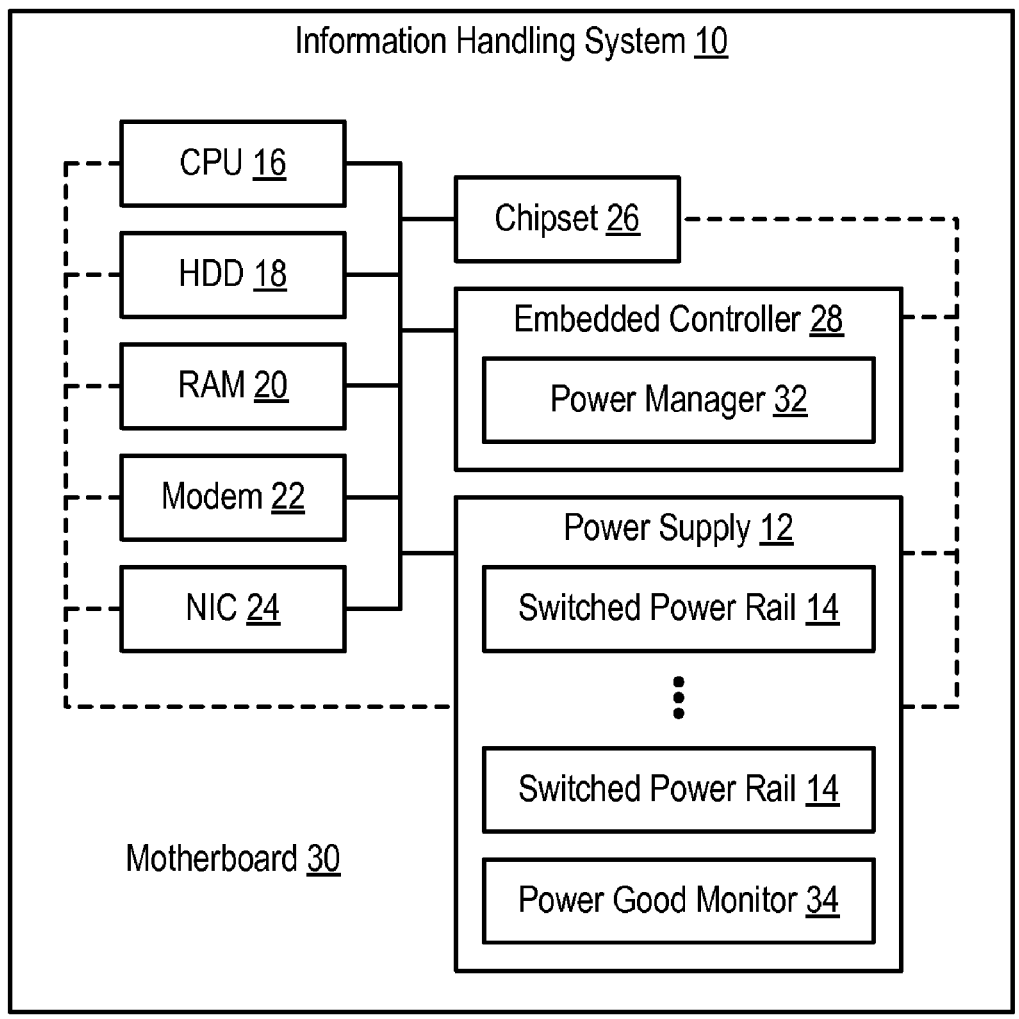
FIG. 1 depicts a block diagram of an information handling system having a power supply with plural switched power rails.

Referring now to FIG. 1, a block diagram depicts an information handling system 10 having a power supply 12 with plural switched power rails 14. Information handling system 10 has plural processing components that cooperate to process information, such as a CPU 16, a hard disk drive (HDD) 18, RAM 20, a modem 22, a network interface card (NIC) 24, chipset 26 and an embedded controller 28. Power supply 12 provides power to the processing components with switched power rails 14 and other types of power rails that are connected with the processing components through a motherboard 30. A power manager 32 running on embedded controller 28 manages the power output by power supply 12. A power good monitor 34 associated with power supply 12 monitors switched power rails 14 for failures and reports the failures to power manager 32 for appropriate corrective action, such as shutting down information handling system 10.

Figure 2:
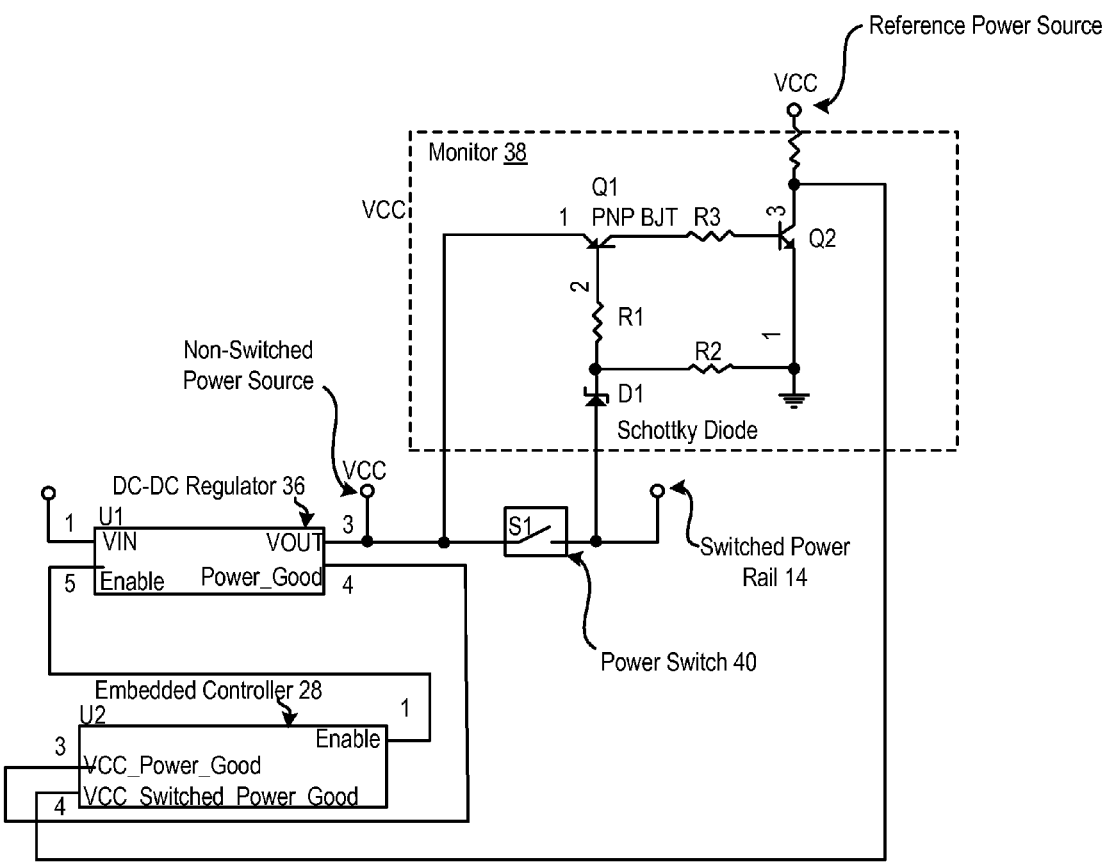
FIG. 2 depicts a circuit diagram of the interaction of a switched power rail with a power supply and embedded controller.

Referring now to FIG. 2, a circuit diagram depicts the interaction of a switched power rail 14 with a power supply 12 and embedded controller 28. An unregulated power source enters a DC-DC regulator 36 at pin 1 and outputs a non-switched power source Vcc from pin 3. Application of power to DC-DC regulator 36 results in a Power Good signal from pin 4 to a Vcc Power Good pin 3 of embedded controller 28. As long as a Power Good signal enters embedded controller 28 at pin 4, such as from a switched power monitoring 38, embedded controller 28 returns an enable signal from pin to DC-DC regulator 36 pin 5 to continue to apply power to the information handling system. However, if switched power monitor circuit 38 fails to provide Power Good signal, embedded controller 28 ceases the Power Good enable signal from pin 1 to pin 5 of DC-DC regulator 36 so that power is turned off to the information handling system. Power output as Vcc proceeds to a power switch 40 that controls the application of power to a switched power rail 14. When power switch 40 is closed to provide power to switched power rail 14, power also enters switched power rail monitor 38 for a comparison with VCC. If the difference between the voltage Vcc at the non-switched power rail differs by more than a predetermined amount from the voltage of switched power rail 14, switched power rail monitor 38 ceases a Power Good signal to pin 4 of embedded controller 28 so that power is turned off from DC-DC regulator 36.

Figure 3:
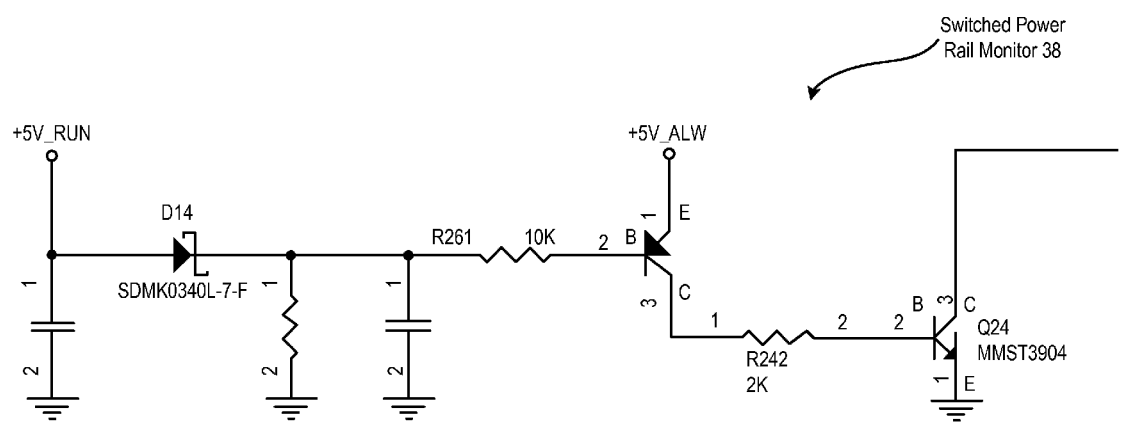
FIG. 3 depicts a circuit diagram of an example embodiment of a switched power rail monitor.

Referring now to FIG. 3, a circuit diagram depicts an example embodiment of a switched power rail monitor 38. Switch power rail monitor 38 provides a low cost comparator-based power good monitor using a low base emitter voltage (Vbe) saturation voltage of PNP bipolar junction transistors (BJT), which are normally used as an electronic switch. The BJTs monitor the voltage difference between the reference voltage Vcc and the switched power rail voltage to generate a power good signal for predetermined voltage parameters. If the switched power rail voltage falls below Vcc by more than a predetermined circuit threshold voltage, the power good signal is deasserted. The circuit threshold voltage is determined by the difference of a forward BJT Vbe saturation voltage, such as 0.6Volts, and a diode forward voltage, such as 0.3Volts. Thus, the combined threshold voltage using these examples is about 0.3Volts.

As depicted in FIG. 3, switched power rail monitor 38 5V_RUN is a switched power rail 14 that derives power from 5V_ALW through a power switch 40, as depicted in FIG. 2. A base emitter junction of a BJT Q27 is connected across the switch for the monitored switched power rail from 5V_ALW to 5V_RUN. Switched power rail monitor circuit 38 operates based upon the voltage differential of deltaV=V_5RUN-V_5ALW. When the deltaV is greater than Vbe_bjt_Q27 minus Vdiode_forward_d14, such as a value of 0.3V, current flows from the base node of the transistor to ground through resistors R261 and R240. This allows current to flow from the source BJT collector node of Q27 to the base node of the NPN BJT Q24, thus turning on transistor Q24 to pull the collector node to ground. Thus, in the example depicted in FIG. 3, the power good signal output from transistor Q24 is low to indicate a fault when V_5RUN<4.7V where V_5ALW is 5V. When the source power rail and switched power rail are within the predetermined limits, such as 0.3V, the voltage at the base node of PNP BJT Q27 will be V_5VALW minus Vdiode_d14 and have a value of less 0.6V for Vbe. This prevents the flow of base-emitter current so that PNP BJT Q27 is off, resulting in NPN BJT Q24 turning off to float the collector node. The collector node of Q24 is pulled up with a pull-up resistor so that a logic high-level output from Q24 indicates a positive power good signal. A series resistor R261 disposed between the reference voltage 5V_ALW and the switched rail 5V_RUN to limit the base-emitter current of BJT Q27. A diode D14 prevents backdrive between the reference and switched rails when the switched rail is off.

Figure 4:
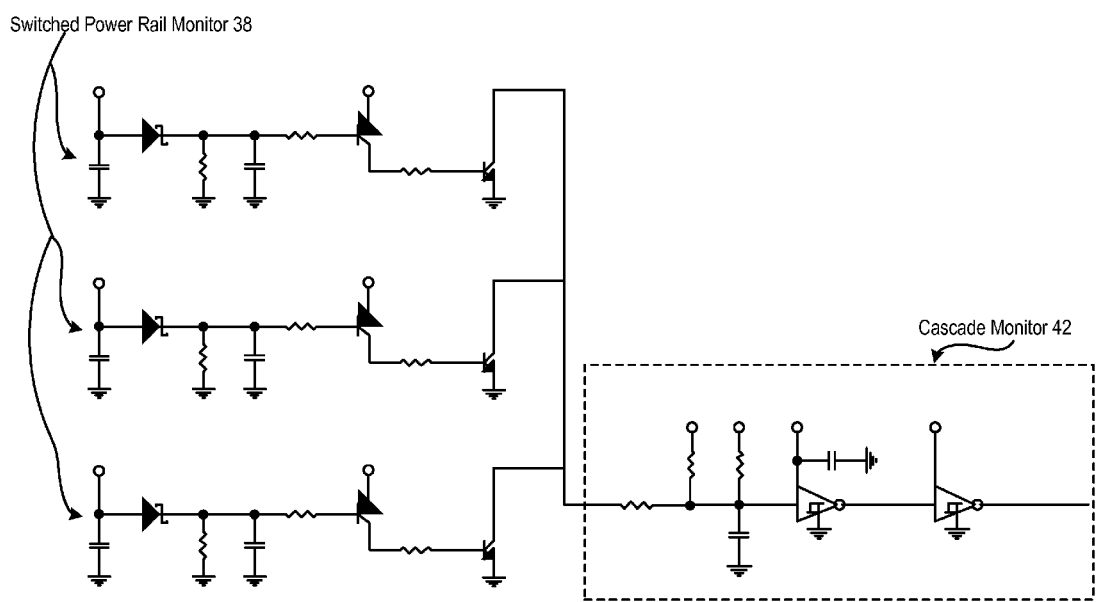
FIG. 4 depicts a circuit diagram of cascaded switched power rail monitors input to a cascade monitor to provide a single Power Good signal from plural switched power rail monitors.

Referring now to FIG. 4, a circuit diagram depicts cascaded switched power rail monitors 38 input to a cascade monitor 42 to provide a single Power Good signal from plural monitors 38. A switched power rail monitor is associated with each of plural switched power rails. The output of each switched power rail monitor forms a wired OR function to output a single Power Good signal from cascade monitor 42. In addition to cascading of the switched power rails, other open-drain or open-collector power good signals are cascaded from other source power supplies. Thus, a combined Power Good signal is obtained to indicate that both switched rails and non-switched rails are within the predetermined Vf-Vbe limit of the circuit. Control logic within the embedded controller can utilize the power good signal for power sequencing and diagnostics.

Although the present invention has been described in detail, it should be understood that various changes, substitutions and alterations could be made hereto without departing from the spirit and scope of the invention as defined by the appended claims.

What is claimed is:

1. An information handling system comprising:
    plural processing components operable to process information;
    a power supply operable to provide power to the processing components;
    a first switched power rail operable to communicate power from the power supply to one or more processing components, the first switched power rail having a first switch that selectively interfaces the first switched power rail and the power supply;
    a second switched power rail operable to communicate power from the power supply to one or more processing components, the second switched power rail having a second switch that selectively interfaces the second switched power rail and the power supply;
    a power manager operable to manage application of power from the power supply to the first and second switched power rails; and
    a power good monitor interfaced with the first and second switched power rails and the power manager, the power good monitor operable to detect a failure associated with each of the switched power rails and to communicate the failure of any one switched power rail to the power manager.

2. The information handling system of claim 1 wherein the power good monitor communicates the failure by removing an enable signal applied to the power manager so that the power source ceases application of power to the processing components.

3. The information handling system of claim 1 wherein the power good monitor comprises first and second bipolar junction transistors operable to detect a predetermined voltage differential between the switched power rail and the power supply.

4. The information handling system of claim 3 wherein the predetermined voltage differential comprises approximately 0.3V.

5. The information handling system of claim 3 wherein the power good monitor further comprises a diode operable to prevent backdrive.

6. The information handling system of claim 1 further comprising:
    plural power good monitors, at least one power good monitor associated with each switched power rail; and
    a cascade monitor interfaced with each power good monitor and the power manager, the cascade monitor operable to detect a failure at any one power good monitor and to communicate the failure to the power manager.

7. The information handling system of claim 6 wherein each power good monitor is operable to output an enable signal or a disable signal and the cascade monitor comprises an OR circuit that outputs a disable signal if any power good monitor outputs a disable signal.

8. A method for providing power to information handling system components, the method comprising:
    outputting power from a power source at a reference voltage;
    selectively engaging a first switch to apply the power source to a first switched power rail;
    powering a component with the first switched power rail at a first switched power rail voltage;
    selectively engaging a second switch to apply the power source to a second switched power rail;
    powering a component with the second switched power rail at a second switched power rail voltage;
    comparing the reference voltage with the first and second switched power rail voltage to detect a fault associated with the first or second switched power rail; and
    ceasing the outputting of power from the power source in response to the fault.

9. The method of claim 8 wherein comparing the reference voltage with the first and second switched power rail voltage further comprises:
    connecting a base emitter junction of a bipolar junction transistor across each switch to receive each switched power rail voltage; and
    connecting a base of each bipolar junction transistor to the reference voltage; and
    flowing current from a collector node of each bipolar junction transistor if the reference voltage has a predetermined differential from the switched power rail voltage.

10. The method of claim 9 wherein flowing current from a collector node of each bipolar junction transistor further comprises flowing current to a second bipolar junction transistor, the second bipolar junction transistor turning on in response to the current to interface a ground with a fault indicator.

11. The method of claim 9 further comprising interfacing one or more resistors between the base of each bipolar junction transistor and the reference voltage to restrict current flow at less than the predetermined differential.

12. The method of claim 9 further comprising interfacing a diode between the base of each bipolar junction transistor and the reference voltage, the diode preventing backdrive to the switched power rail when the switch is disengaged.

13. The method of claim 9 wherein the predetermined differential comprises approximately 0.3V.

14. The method of claim 8 further comprising:
    comparing the reference voltage with the switched power rail voltage at each switched power rail to detect a fault associated with any of the switched power rails; and
    cascading a fault indicator to OR a fault indication to the power source if a fault is detected at any switched power rail.

15. A system for detecting a switched power rail fault, the system comprising:
    a first device interfaced with a power source having a reference voltage and with first and second switched power rails, each having a switched power rail voltage and a switch to selectively interface the power source and the respective switched power rail, the first device operable to output a first current if the reference voltage and the switched power rail voltage have a predetermined differential and a second current if the reference voltage and either of the switched power rail voltage lack the predetermined differential; and
    a second device interfaced with the first device, the second device operable to output an enable signal if the first device outputs the first current and a disable signal if the first device outputs the second current.

16. The system of claim 15 wherein the predetermined differential comprises approximately 0.3V.

17. The system of claim 15 further comprising a diode disposed between the reference voltage and the first device, the diode operable to prevent backdrive between the power source and the switched power rail.

18. The system of claim 15 wherein the first device comprises a bipolar junction transistor having a first node interfaced with the power source, a second node interfaced with one of the switched power rails and a third node interfaced with the second device, the third node operable to output the first current if the predetermined differential exists.

19. The system of claim 18 wherein the second device comprises a bipolar junction transistor having a first node interfaced with the first device third node, a second node interfaced with ground and a third node operable to output a disable signal if the second node receives current and to output an enable signal if the second node does not receive current.

20. The system of claim 19 further comprising a cascade monitor interfaced with the second device third node and operable to interface with plural switched rail monitors, the cascade monitor provide a disable signal if any one switched rail monitor outputs a disable signal.

* * * * *